United States Patent
Driscoll et al.

(10) Patent No.: US 11,781,945 B2
(45) Date of Patent: Oct. 10, 2023

(54) TIRE SIDEWALL TOUGHNESS INDEX METHOD

(71) Applicant: The Goodyear Tire & Rubber Company, Akron, OH (US)

(72) Inventors: Michael Thomas Driscoll, Norton, OH (US); Steven Emery Guba, Jr., Akron, OH (US); Nicholas Anthony Gullatta, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 17/411,754

(22) Filed: Aug. 25, 2021

(65) Prior Publication Data

US 2023/0067174 A1 Mar. 2, 2023

(51) Int. Cl.
*G01M 17/02* (2006.01)
(52) U.S. Cl.
CPC .................. *G01M 17/02* (2013.01)
(58) Field of Classification Search
CPC ..................................................... G01M 17/02
See application file for complete search history.

(56) References Cited

U.S. PATENT DOCUMENTS

| | | | |
|---|---|---|---|
| 3,406,566 A * | 10/1968 | Livingston | G01N 3/40 73/81 |
| 4,265,288 A | 5/1981 | Kaneko et al. | |
| 6,729,179 B2 | 5/2004 | Crema et al. | |
| 7,677,077 B2 | 3/2010 | Mahoney et al. | |
| 9,683,917 B2 | 6/2017 | Gerardin et al. | |
| 2002/0174019 A1* | 11/2002 | Henderson | G06Q 30/02 705/26.4 |
| 2003/0037608 A1* | 2/2003 | Crema | G01M 17/02 73/146 |

(Continued)

FOREIGN PATENT DOCUMENTS

| | | | |
|---|---|---|---|
| WO | 2011065938 A1 | 6/2011 | |
| WO | WO-2015005099 A1 * | 1/2015 | ............ G01M 17/02 |

OTHER PUBLICATIONS

Harris J.R. et al, Evaluation of Laboratory Tire Tread and Sidewall Strength (Plunger Energy) Test Methods, Evaluation of Laboratory Tire Tread and Sidewall Strength (Plunger Energy) Test Methods, Jul. 31, 2013 (Jul. 31, 2013), 28-29, 32-36, figures 6.2, 6.4, National Highway Traffic Safety Administration, Washington, DC, US.

(Continued)

*Primary Examiner* — Natalie Huls
*Assistant Examiner* — Cynthia L Davis
(74) *Attorney, Agent, or Firm* — Edward T. Kennedy (57) ABSTRACT

A method for determining a sidewall toughness index for a tire includes providing a first tire that includes a pair of sidewalls. A first physical test is conducted on a selected one of the sidewalls of the first tire, and a result of the first test is recorded. A second tire of the same type as the first tire is provided, and includes a pair of sidewalls. A second physical test is conducted on a selected one of the sidewalls of the second tire, and a result of the second test is recorded. The result of each of the first physical test and the second physical test is normalized. A sidewall toughness index is generated by combining the normalized result of the first physical test and the normalized result of the second physical test.

19 Claims, 7 Drawing Sheets

(56) References Cited

U.S. PATENT DOCUMENTS

| | | | | |
|---|---|---|---|---|
| 2012/0245859 A1* | 9/2012 | Gerardin | ............. | G01M 17/022 |
| | | | | 73/146 |
| 2013/0180637 A1* | 7/2013 | Hattori | ................. | B60C 19/086 |
| | | | | 524/496 |
| 2016/0167435 A1* | 6/2016 | Onuki | ................... | B60C 9/0007 |
| | | | | 152/556 |

OTHER PUBLICATIONS

Search report for corresponding European application received by applicant Jan. 4, 2023.

\* cited by examiner

TIRE SIDEWALL TOUGHNESS INDEX METHOD

FIELD OF THE INVENTION

The invention relates generally to tires. More particularly, the invention relates to the testing of tires, and particularly tire sidewalls. Specifically, the invention is directed to a method for testing the resistance of tire sidewalls to damage that includes conducting separate physical tests, normalizing the results, and creating a composite sidewall toughness index.

BACKGROUND OF THE INVENTION

Pneumatic tires have been widely employed. Such tires include a pair of beads that are mounted on a wheel. Each one of pair of sidewalls extends from a respective bead to a ground-engaging tread. A carcass, which is made of one or more plies, toroidally extends between the beads to reinforce the sidewalls and the tread. An innerliner is formed on the inside surface of the carcass. The wheel cooperates with the innerliner to define an interior cavity that is inflated with air.

It has been desirable to test the resistance of the tire sidewalls to damage, and particularly punctures. Sidewall punctures can be a function of a sharp object entering the sidewall at a direction normal to the surface of the sidewall, a torque tear in which the tire rolls past a semi-sharp object, pinching of the sidewall in the wheel or rim, and/or slicing of the tire sidewall by a sharp object. In the prior art, tests have been developed to test the resistance of a sidewall to damage.

For example, a torque tear test has been used for such testing. The torque tear test includes mounting a tire to be tested on a vehicle. A test fixture is positioned in front of the tire and includes two parallel plates. A sharp object is mounted in one of the plates, and may be a bolt that includes an end which has been machined down to a diameter of about one-third of an inch.

The vehicle is driven forward into the fixture until the tire passes between the two plates. The parallel plates of the fixture guide the tire and prevent lateral movement. Initially, the sharp object is positioned laterally so that the sharp end makes minimal contact with the tire sidewall. The vehicle is driven slowly through the fixture until the tire exits the plates. After the first pass through the fixture, the sharp object is moved in the direction of the tire, so that the sharp end protrudes further towards the tire sidewall. The vehicle is again driven through the fixture. This process repeats until the tire loses air due to the sharp end tearing the sidewall.

The amount of movement of the sharp object that leads to air loss of the tire is recorded. The lateral location of the sharp object when the tire loses air determines the performance of the sidewall, in which a greater amount of movement of the sharp object indicates a higher sidewall torque tear resistance. In this manner, the torque tear resistance test provides a measure of the resistance of the tire to sidewall damage. One type of tire may be compared to another using such a method, based upon the amount of movement of the sharp object that lead to air loss.

While the torque tear performance provides a measure of the resistance of the tire to sidewall damage, and particularly punctures, the test only accounts for a single mode of damage from punctures. It is desirable to improve sidewall testing to account for additional modes of sidewall damage from punctures.

As a result, there is a need in the art for a method for testing the resistance of a tire sidewall to damage that accounts for multiple modes of sidewall damage from punctures.

SUMMARY OF THE INVENTION

According to an aspect of an exemplary embodiment of the invention, a method for determining a sidewall toughness index for a tire is provided. The method includes the steps of providing a first tire that includes a pair of bead areas, a tread, and a pair of sidewalls, in which each one of the sidewalls extends from a respective one of the bead areas to the tread. A first physical test is conducted on a selected one of the sidewalls of the first tire, and a result of the first physical test is recorded. A second tire of the same type as the first tire is provided. The second tire includes a pair of bead areas, a tread, and a pair of sidewalls, in which each one of the sidewalls extends from a respective one of the bead areas to the tread. A second physical test is conducted on a selected one of the sidewalls of the second tire, and a result of the second physical test is recorded. The result of the first physical test is normalized, and the result of the second physical test is normalized. A sidewall toughness index is generated by combining the normalized result of the first physical test and the normalized result of the second physical test.

BRIEF DESCRIPTION OF THE DRAWINGS

The invention will be described by way of example and with reference to the accompanying drawings, in which.

Similar numerals refer to similar parts throughout the drawings.

Definitions

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"Radial-ply tire" means a belted or circumferentially-restricted pneumatic tire in which the ply cords which extend from bead to bead are laid at cord angles between about 65 to about 90 degrees with respect to the equatorial plane of the tire.

DETAILED DESCRIPTION OF THE INVENTION

With reference to FIGS. 1 through 7, an exemplary embodiment of the method for determining a sidewall toughness index of the present invention is indicated at 30. The method 30 tests the resistance of a sidewall of a tire 10 to damage, as will be described in greater detail below. It is to be understood that the method 30 tests a sidewall of any tire type, including passenger car tires, sport utility vehicle tires, light truck tires, heavy duty truck tires, airplane tires, tire for off the road vehicles, and the like.

Figure 1:
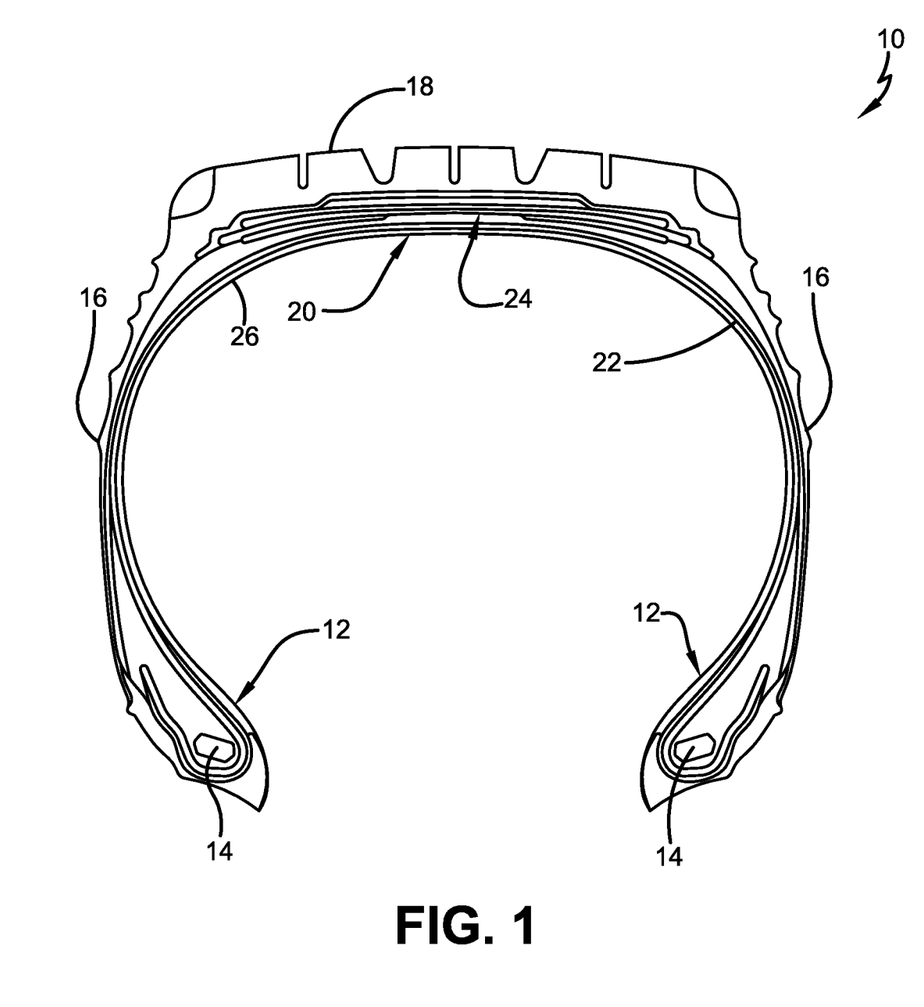
FIG. 1 is a cross sectional view of a tire that may be tested in accordance with an exemplary embodiment of the method for determining a sidewall toughness index of the present invention.
Figure 2:
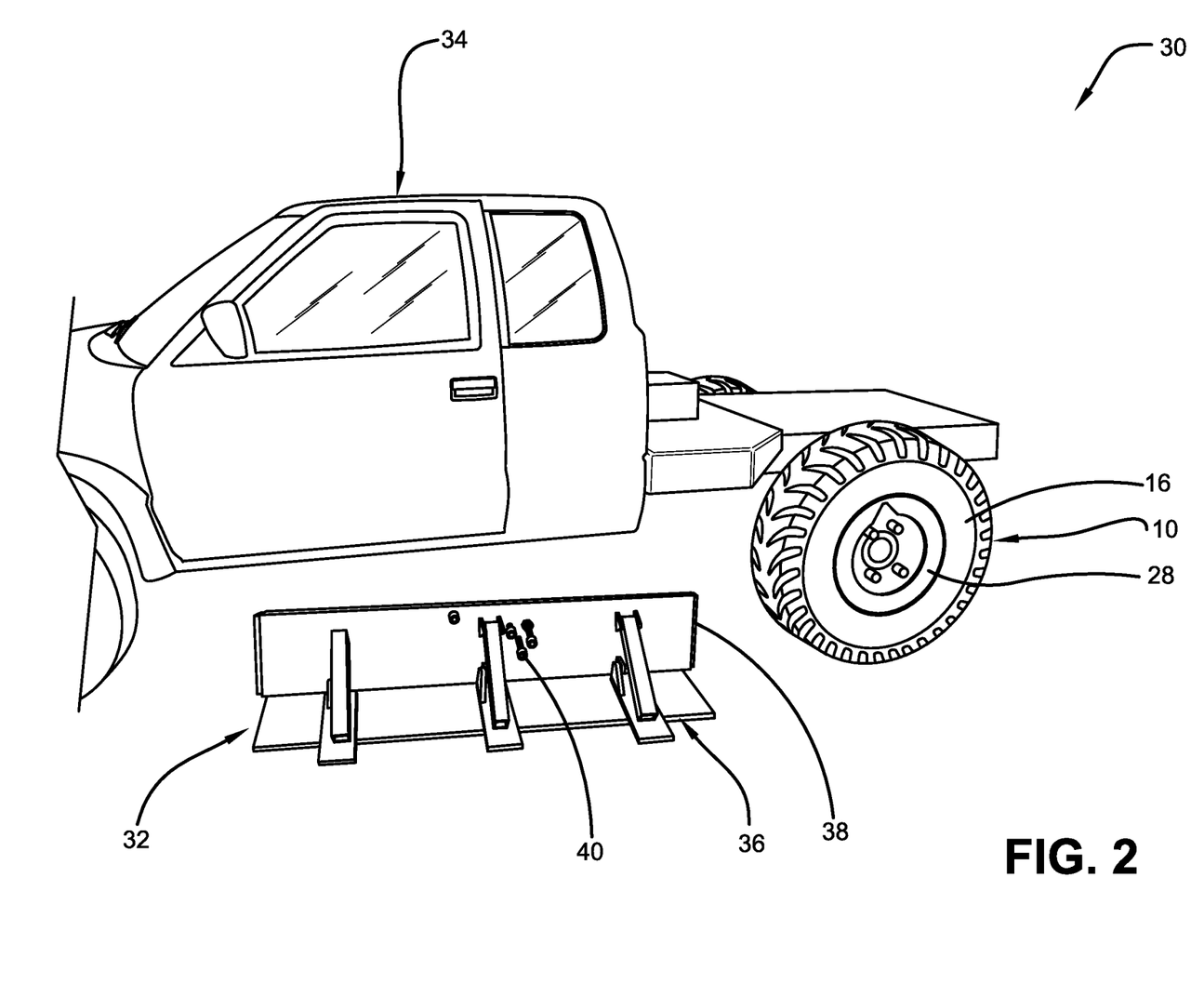
FIG. 2 is a schematic perspective view of a first test procedure of an exemplary embodiment of the method for determining a sidewall toughness index of the present invention.

Turning to FIG. 1, the tire 10 includes a pair of bead areas 12 and a respective bead core 14 embedded in each bead area. A respective sidewall 16 extends radially outward from each bead area 12 to a ground-contacting tread 18. The tire 10 is reinforced by a carcass 20 that toroidally extends from one of the bead areas 12 to the other one of the bead areas. The carcass 20 includes at least one ply 22 that preferably winds around each bead core 14. A belt reinforcement package 24 is disposed between the carcass 20 and the tread 18. An innerliner 26 is formed on the inside surface of the carcass. As shown in FIG. 2, the tire 10 is mounted on a wheel 28, as known in the art.

The method for determining a sidewall toughness index 30 preferably includes conducting different physical tests to evaluate the robustness of the tire sidewall 16. At least two tests are conducted. By way of example, a first test may be a torque tear performance test 32, as shown in FIG. 2. The torque tear performance test 32 includes mounting the tire 10 to be tested on a vehicle 34. A test fixture 36 is positioned in front of the tire 10 and includes a first plate 38 and a second plate (not shown). A sharp object 40 is mounted in the first plate 38, and includes a sharpened end, such as an end that has been machined down to a diameter of about one-third of an inch. The vehicle 34 is driven forward into the fixture 36 until the tire 10 passes between the plates.

Initially, the sharp object 40 is positioned laterally so that the machined end makes minimal contact with the tire sidewall 16. The vehicle 34 is driven slowly through the test fixture 36 until the tire exits the fixture. After the first pass of the tire 10 through the fixture 36, the sharp object 40, which may be a bolt, is moved or turned in the direction of the tire by one revolution, so that the machined end protrudes further towards the tire sidewall 16, and the vehicle is again driven through the fixture. This process repeats until the tire 10 loses air due to the machined end of the sharp object or bolt 40 tearing the sidewall 16.

When the bolt 40 tears the tire sidewall 16, the number of bolt revolutions that lead to tire air loss is recorded. The result of the torque tear performance test 32 is initially indicated as a number of revolutions of the sharp object or bolt 40, which dictates the lateral location of the bolt when the tire 10 loses air. The number of revolutions of the bolt 40 determines the performance of the sidewall 16, as a higher number of revolutions of the bolt indicates a higher resistance of the sidewall to torque tearing.

Figure 3:
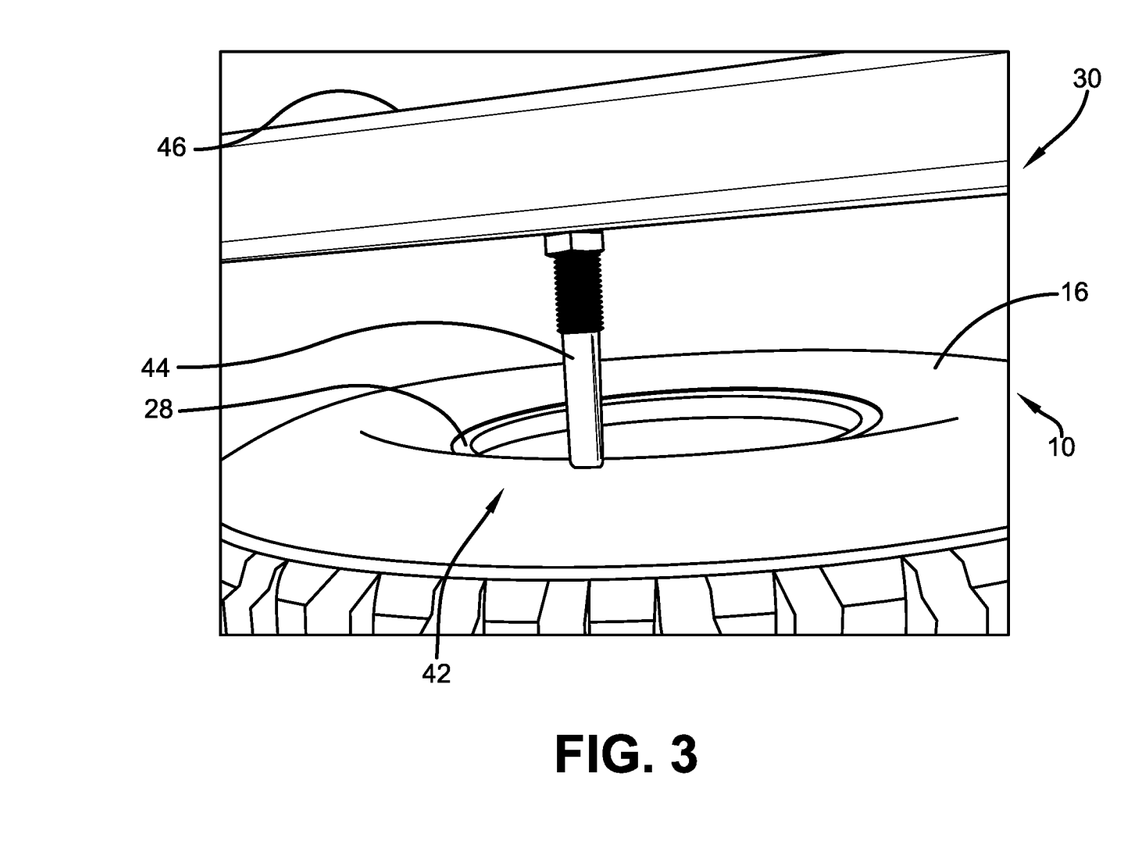
FIG. 3 is a schematic perspective view of a second test procedure of an exemplary embodiment of the method for determining a sidewall toughness index of the present invention.

As mentioned above, the method for determining a sidewall toughness index 30 preferably includes conducting at least two different physical tests to evaluate the robustness of the tire sidewall 16. A second test to evaluate the robustness of the tire sidewall 16 includes a sidewall plunger test 42, which is shown in FIG. 3. The sidewall plunger test 42 evaluates a puncture from a sharp object 44 entering the sidewall 16 of the tire 10 from a direction that is normal to the surface of the sidewall.

The tire 10, which preferably is a separate tire from the one used in the torque tear performance test 32, but is of the same type and construction, is mounted on a wheel 28. The sharp object 44 may be a chisel, and is mounted on an arm or platen 46 of a press that may be hydraulically, pneumatically, or electrically actuated. The load on the chisel 44 at a puncture of the sidewall 16 resulting in loss of air from the tire 10 is recorded.

The performance of the tire 10 is determined by the load on chisel 44 at a puncture of the sidewall 16 resulting in air loss. The result of the sidewall plunger test 42 is initially indicated as the load on the chisel 44 at air loss. Specifically, a higher load on the chisel 44 at puncture of the tire 10 indicates a higher resistance of the sidewall 16 to puncture.

Figure 4:
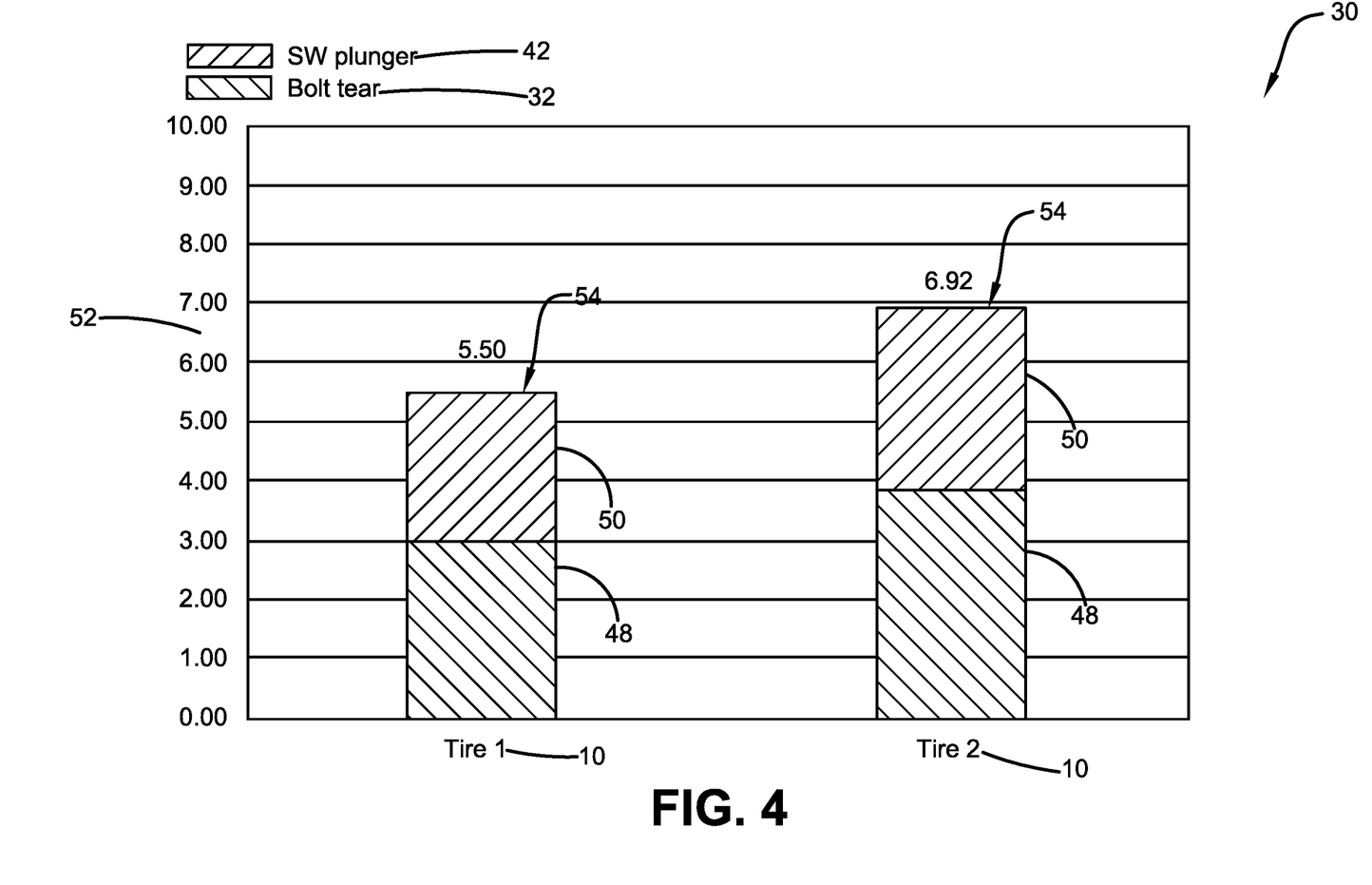
FIG. 4 is a first graphical representation of a composite sidewall toughness index in accordance with an exemplary embodiment of the method for determining a sidewall toughness index of the present invention.

Turning to FIG. 4, the result of each test is normalized for each tire type 10, which includes adjusting the values of the results to a common scale 52. For example, the result of each test may be converted to a scale ranging from 1 to 5, with 1 being the minimum observable value and 5 being the maximum observable value.

In this manner, the number of revolutions from the torque tear performance test 32 is normalized to a torque tear normalized result 48, which in this example is a scale ranging from 1 to 5. A higher number of revolutions of the sharp object or bolt 40 and thus a higher torque tear normalized result 48 indicates a higher resistance of the tire sidewall 16 to torque tearing. Likewise, the load on the chisel 44 at tire loss from the sidewall plunger test 42 is normalized to a sidewall plunger normalized result 50, which is in this example is a scale ranging from 1 to 5. A higher load on the chisel 44 at puncture of the tire 10 and thus a higher sidewall plunger normalized result 50 indicates a higher resistance of the sidewall 16 to puncture.

To provide a comprehensive evaluation of the robustness of the sidewall 16 of the tire 10, the normalized test results, such as the torque tear normalized result 48 and the sidewall plunger normalized result 50, may be combined by summing or weighting to generate a composite score, which is referred to as a sidewall toughness index 54. The sidewall toughness index 54 may thus be the sum of the normalized tests being equally weighted, or may be a weighted result of the normalized tests, to provide a composite rating of robustness of the sidewall 16 of the tire 10.

In this example, a value of the sidewall toughness index 54 may range from 2 to 10, which corresponds to summing the result of each individual test, which ranges from 1 to 5. A higher value for the sidewall toughness index 54 correlates to a sidewall 16 that is more robust and more resistant to damage. More particularly, as described above, a higher torque tear normalized result 48 indicates a higher resistance of the tire sidewall 16 to torque tearing, and a higher sidewall plunger normalized result 50 indicates a higher resistance of the sidewall to puncture. When both results are added together, a higher sidewall toughness index 54 is achieved, which indicates that the sidewall 16 is more robust and resistant to damage.

As shown in FIG. 4, the sidewall toughness index 54 for one type of tire, indicated at Tire 1, may be compared to the sidewall toughness index for another type of tire, indicated at Tire 2. In this example, the torque tear normalized result 48 for Tire 1 is about 3.00 and the sidewall plunger normalized result 50 is about 2.50, yielding a sidewall toughness index 54 of about 5.50. The torque tear normalized test result 48 for Tire 2 is about 3.80 and the sidewall plunger normalized result 50 is about 3.12, yielding a sidewall toughness index 54 of about 6.92. Based on the higher sidewall toughness index 54, Tire 2 has a more robust sidewall 16, indicating that the sidewall of Tire 2 is more resistant to damage than Tire 1.

Figure 5:
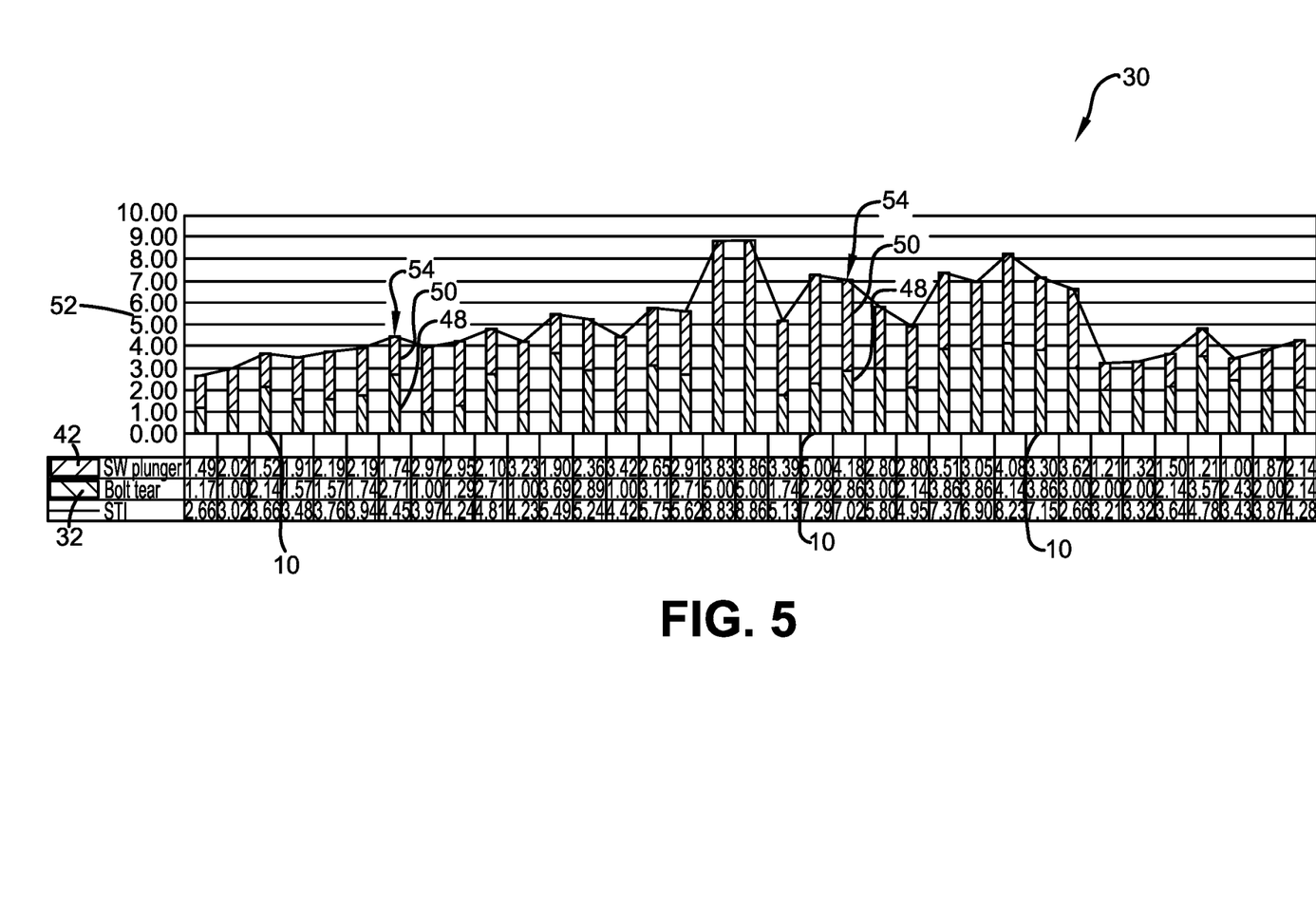
FIG. 5 is a second graphical representation of a composite sidewall toughness index in accordance with an exemplary embodiment of the method for determining a sidewall toughness index of the present invention.

Turning now to FIG. 5, the method for determining a sidewall toughness index 30 enables a respective sidewall toughness index 54 for each one of many types of tires 10 may be compared to one another. As described above, the sidewall toughness index 54 is comprised of the torque tear normalized result 48 and the sidewall plunger normalized result 50 for the sidewall 16 of each respective type of tire 10. The chart shown in FIG. 5 demonstrates a convenient display of individual test performances of each respective type of tire 10 for a normalized comparison.

Figure 7:
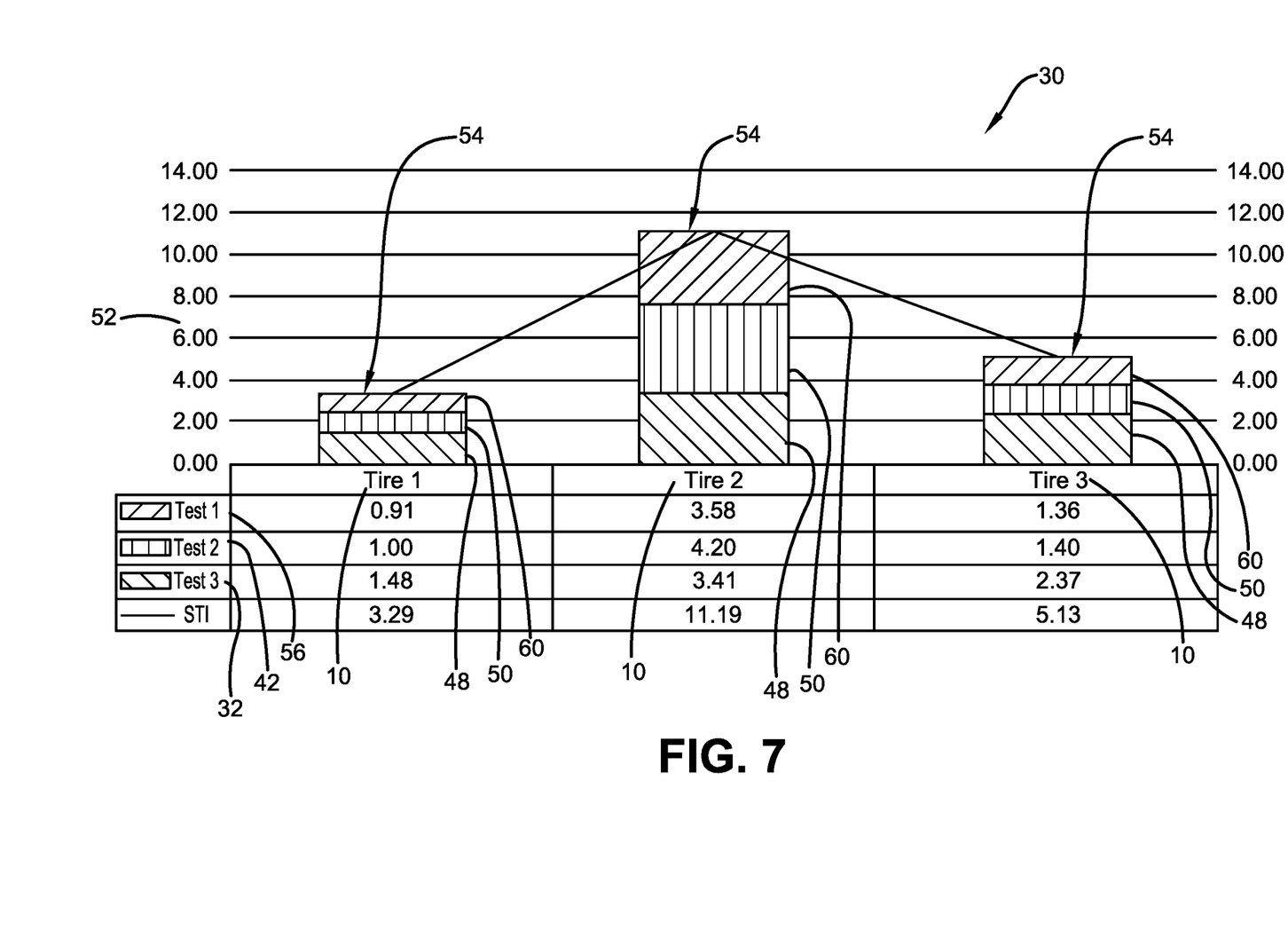
FIG. 7 is a third graphical representation of a composite sidewall toughness index in accordance with an exemplary embodiment of the method for determining a sidewall toughness index of the present invention.

As mentioned above, the method for determining a sidewall toughness index 30 preferably includes conducting at least two different physical tests to evaluate the robustness of the tire sidewall 16. As shown in FIG. 7, three different tests may be conducted. The first test may be the torque tear performance test 32, resulting in the torque tear normalized result 48, which may be in a scale ranging from 1 to 5. The second test may be the sidewall plunger test 42, resulting in the sidewall plunger normalized result 50, which may be in a scale ranging from 1 to 5.

Figure 6:
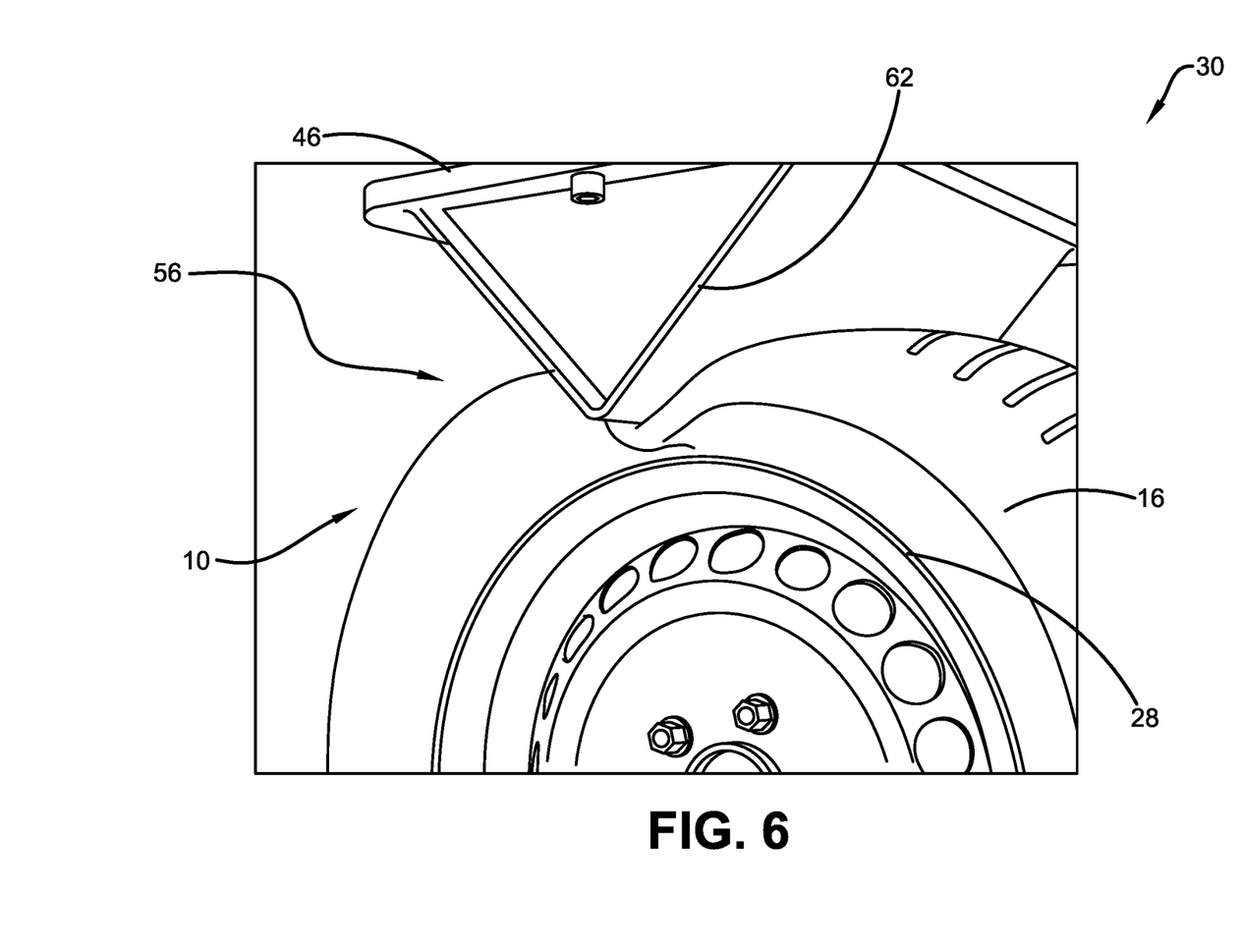
FIG. 6 is a schematic perspective view of a third test procedure of an exemplary embodiment of the method for determining a sidewall toughness index of the present invention.

Referring to FIG. 6, a third test may be a test that measures damage to the sidewall 16 from pinching of the sidewall in the wheel or rim 28, which is known as a rim pinch test 56. In the rim pinch test 56, the tire 10, which preferably is a separate tire from the one used in the torque tear performance test 32 and the sidewall plunger test 42, but is of the same type and construction, is mounted on a wheel 28. A wedge object 62 is mounted on an arm or platen 46 of a press that may be hydraulically, pneumatically, or electrically actuated. The wedge 62 is pressed into the crown area of the tire 10, which pinches the sidewall 16 between the wedge and a flange of the rim or wheel 28. The load on the wedge 62 is measured, and it is known in the art that internal damage of the tire 10 occurs when there is an abrupt change in the load on the wedge. The result of the rim pinch test 56 is initially indicated as the maximum load on the wedge 62 when the abrupt load change occurs.

Returning to FIG. 7, a higher value for the result of the rim pinch test 56 indicates a higher resistance of the sidewall 16 to puncture. The result of the rim pinch test 56 preferably is normalized to a rim pinch normalized result 60, which is in this example is in a scale ranging from 1 to 5.

To provide a comprehensive evaluation of the robustness of the sidewall 16 of the tire 10, the normalized test results, such as the torque tear normalized result 48, the sidewall plunger normalized result 50, and the rim pinch normalized result 60, may be combined by summing or weighting to generate the sidewall toughness index 54. In this example, a value of the sidewall toughness index 54 may range from 3 to 15, which corresponds to summing the result of each individual test, which ranges from 1 to 5. A higher value for the sidewall toughness index 54 correlates to a sidewall 16 that is more robust and more resistant to damage.

As shown in FIG. 7, the sidewall toughness index 54 for a first type of tire, indicated at Tire 1, may be compared to the sidewall toughness index for a second type of tire, indicated at Tire 2, and to the sidewall toughness index for a third type of tire, indicated at Tire 3. In this example, Tire 2 has a higher sidewall toughness index 54, and thus has a more robust sidewall 16 than Tire 1 and Tire 3, indicating that the sidewall of Tire 2 is more resistant to damage than Tire 1 and Tire 3.

In this manner, the method for determining a sidewall toughness index 30 enables a respective sidewall toughness index 54 for each one of multiple types of tires 10 may be compared to one another. The chart shown in FIG. 7 demonstrates a convenient display of individual test performances of each respective type of tire 10 for a normalized comparison.

It is to be understood that more than two or three different physical tests may be conducted in the method for determining a sidewall toughness index 30. The tests may be other than those shown and described above without affecting the overall concept or operation of the invention. For example, tests may include the torque tear performance test 32, the sidewall plunger test 42, the rim pinch test 56, a sharp object slicing test, and/or materials tests that evaluate a specific material property, such as a Demattia flex test. In addition, while the method for determining a sidewall toughness index 30 is described above employing two different physical tests and three different physical tests, any number or combination of two or more tests may be employed without affecting the overall concept or operation of the invention.

In this manner, the method for determining a sidewall toughness index 30 of the present invention provides a method for testing the resistance of tire sidewalls 16 to damage that includes conducting separate physical tests, normalizing the results of each test, and creating a composite sidewall toughness index 54 from the normalized test results. The method 30 enables the robustness of tire sidewalls 16 to be determined with increased accuracy and repeatability, regardless of design features that are included on each sidewall.

It is to be understood that the above-described method for determining a sidewall toughness index of the present invention and associated structure may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A method for determining a sidewall toughness index for a tire, the method comprising the steps of:
   providing a first tire that includes a pair of bead areas, a tread, and a pair of sidewalls, each one of the sidewalls extending from a respective one of the bead areas to the tread;
   conducting a first physical test on a selected one of the sidewalls of the first tire, the first physical test including a first mode of sidewall damage from a first tool;
   recording a result of the first physical test;
   providing a second tire, the second tire including a pair of bead areas, a tread, and a pair of sidewalls, each one of the sidewalls extending from a respective one of the bead areas to the tread;
   conducting a second physical test on a selected one of the sidewalls of the second tire, the second physical test being a different test than the first physical test and including a second mode of sidewall damage from a second tool, the second mode of sidewall damage being different from the first mode of sidewall damage and the second tool being a different tool than the first tool;
   recording a result of the second physical test;
   normalizing the result of the first physical test;
   normalizing the result of the second physical test; and
   generating a single sidewall toughness index by combining the normalized result of the first physical test that includes the first mode of sidewall damage from the first tool and the normalized result of the second physical test that includes the second mode of sidewall damage from the second tool.

2. The method for determining a sidewall toughness index for a tire of claim 1, wherein the step of generating a sidewall toughness index by combining the normalized result of the first physical test and the normalized result of the second physical test includes summing the normalized result of the first physical test and the normalized result of the second physical test.

3. The method for determining a sidewall toughness index for a tire of claim 1, wherein the step of generating a sidewall toughness index by combining the normalized result of the first physical test and the normalized result of the second physical test includes weighting the normalized result of the first physical test and the normalized result of the second physical test.

4. The method for determining a sidewall toughness index for a tire of claim 1, wherein at least one of the first physical test and the second physical test includes at least one of a torque tear performance test, a sidewall plunger test, a rim pinch test, a sharp object slicing test, and a materials test.

5. The method for determining a sidewall toughness index for a tire of claim 1, wherein the step of conducting the first physical test includes a torque tear performance test.

6. The method for determining a sidewall toughness index for a tire of claim 5, wherein the torque tear performance test includes passing the first tire through a fixture, the fixture including a bolt with a machined end engaging the selected one of the tire sidewalls.

7. The method for determining a sidewall toughness index for a tire of claim 6, wherein each time the first tire passes through the fixture, the bolt is turned in the direction of the first tire by one revolution, until the first tire loses air.

8. The method for determining a sidewall toughness index for a tire of claim 6, wherein the result of the first physical test is indicated by a number of revolutions of the bolt.

9. The method for determining a sidewall toughness index for a tire of claim 1, wherein the step of conducting the second physical test includes a sidewall plunger test.

10. The method for determining a sidewall toughness index for a tire of claim 9, wherein the sidewall plunger test evaluates a puncture from a sharp object entering the selected one of the sidewalls of the second tire from a direction that is normal to the surface of the selected one of the sidewalls.

11. The method for determining a sidewall toughness index for a tire of claim 10, wherein the sharp object is a chisel, and the result of the second physical test is indicated by a load on the chisel at a puncture of the selected one of the sidewalls that results in loss of air from the second tire.

12. The method for determining a sidewall toughness index for a tire of claim 1, wherein the step of normalizing the results of the first physical test and the second physical test includes converting the result of each test to a scale ranging from 1 to 5, with 1 being a minimum observable value and 5 being a maximum observable value.

13. The method for determining a sidewall toughness index for a tire of claim 12, wherein the step of generating a sidewall toughness index provides a composite rating of robustness of the selected sidewalls of the first and second tires, which are of a same type, in a range from 2 to 10.

14. The method for determining a sidewall toughness index for a tire of claim 13, wherein a higher value of the sidewall toughness index indicates that the selected sidewalls are more resistant to damage.

15. The method for determining a sidewall toughness index for a tire of claim 1, wherein the step of generating a sidewall toughness index is a first sidewall toughness index corresponding to the first and second tires, which are of a same type, and the method further comprises the steps of:
   generating a second sidewall toughness index for a tire type that is different from the first and second tire type; and
   comparing the first sidewall toughness index and the second sidewall toughness index.

16. The method for determining a sidewall toughness index for a tire of claim 1, wherein the step of generating a sidewall toughness index is a first sidewall toughness index corresponding to the first and second tires, which are of a same type, and the method further comprises the steps of:
   generating a plurality of additional sidewall toughness indexes for respective tire types that are different from the first and second tire type; and
   comparing the first sidewall toughness index to each of the plurality of additional sidewall toughness indexes.

17. The method for determining a sidewall toughness index for a tire of claim 1, further comprising the steps of:
   providing a third tire, the third tire including a pair of bead areas, a tread, and a pair of sidewalls, each one of the sidewalls extending from a respective one of the bead areas to the tread;
   conducting a third physical test on a selected one of the sidewalls of the third tire, the third physical test being a different test than the first and second physical tests and including a third mode of sidewall damage from a third tool, the third mode of sidewall damage being different from the first and second modes of sidewall damage and the third tool being a different tool than the first and second tools;

recording a result of the third physical test;

normalizing the result of the third physical test; and wherein the step of generating a sidewall toughness index includes combining the normalized result of the first physical test, the normalized result of the second physical test, and the normalized result of the third physical test.

18. The method for determining a sidewall toughness index for a tire of claim 17, wherein at least one of the first physical test, the second physical test, and the third physical test includes at least one of a torque tear performance test, a sidewall plunger test, a rim pinch test, a sharp object slicing test, and a materials test.

19. A method for determining a sidewall toughness index for a tire, the method comprising the steps of:

providing a first tire that includes a pair of bead areas, a tread, and a pair of sidewalls, each one of the sidewalls extending from a respective one of the bead areas to the tread;

conducting a torque tear performance test on a selected one of the sidewalls of the first tire;

recording a result of the torque tear performance test;

providing a second tire, the second tire including a pair of bead areas, a tread, and a pair of sidewalls, each one of the sidewalls extending from a respective one of the bead areas to the tread;

conducting a sidewall plunger test on a selected one of the sidewalls of the second tire;

recording a result of the sidewall plunger test;

normalizing the result of the torque tear performance test;

normalizing the result of the sidewall plunger test; and generating a single sidewall toughness index by combining the normalized result of the torque tear performance test and the normalized result of the sidewall plunger test.

\* \* \* \* \*